United States Patent [19]

Höfer et al.

[11] 4,385,183

[45] May 24, 1983

[54] TELOMERIZATION OF WATER-SOLUBLE MONOMERS

[75] Inventors: Rainer Höfer, Düsseldorf; Hans-Christoph Wilk, Neuss; Bernd Wegemund, Haan, all of Fed. Rep. of Germany

[73] Assignee: Henkel Kommanditgesellschaft auf Aktien, Düsseldorf-Holthausen, Fed. Rep. of Germany

[21] Appl. No.: 270,491

[22] Filed: Jun. 4, 1981

[30] Foreign Application Priority Data

Jun. 12, 1980 [DE] Fed. Rep. of Germany ....... 3022044

[51] Int. Cl.$^3$ ..................... C07C 55/22; C07C 55/24
[52] U.S. Cl. .................................... 562/556; 528/290; 562/594
[58] Field of Search ................ 562/556, 594; 528/290

[56] References Cited

U.S. PATENT DOCUMENTS

| 3,665,035 | 5/1972 | Rice et al. | 562/594 |
| 3,772,382 | 11/1973 | Dannels | 562/594 |
| 3,787,488 | 1/1974 | Greenfield | 562/594 |
| 3,839,405 | 10/1974 | Dannels | 562/556 |
| 3,862,975 | 1/1975 | Csontos | 260/455 R |

OTHER PUBLICATIONS

Encyclopedia of Polymer Science and Technology, vol. 5, pp. 816–824 and vol. 13, pp. 478–484.

Primary Examiner—Arthur P. Demers
Attorney, Agent, or Firm—Hammond & Littell, Weissenberger and Muserlian

[57] ABSTRACT

This invention is directed to the telomerization of water-soluble monomers in an aqueous phase. More particularly, this invention is directed to a process for the telomerization of water-soluble monomers and water-insoluble telogens in aqueous phase, wherein the water-insoluble telogens are solubilized by the addition of an effectively solubilizing amount of surface-active compounds.

7 Claims, No Drawings

TELOMERIZATION OF WATER-SOLUBLE MONOMERS

FIELD OF THE INVENTION

This invention is directed to the telomerization of water-soluble monomers in an aqueous phase. More particularly, this invention is directed to the telomerization of water-soluble monomers in aqueous phase with telogens that are substantially water-insoluble.

BACKGROUND OF THE INVENTION

Telomerization in an aqueous medium using water-soluble monomers and water-insoluble telogens is known. For example, U.S. Pat. No. 3,665,035 discloses the telomerization of acrylic acid with mercaptoethanol or thioglycolic acid. Also known is the telomerization of water-soluble monomers such as acrylic acid and water-insoluble telogens such as dodecyl mercaptan in an organic solvent in which all the reactants are soluble. The polymers produced may be insoluble in the solvent that is used, in which case a precipitation polymerization takes place.

Although telomers with molecular weights adjustable within broad limits can be prepared by the telomerization of water-soluble monomers and water-insoluble telogens in an aqueous medium, such adjustability is limited to processes where the telogens that are initially water-insoluble are completely soluble in water at the polymerization temperature. The controlled introduction of a long-chain telogen radical, which is needed for many applications, is not successful in such a procedure. In addition, it has not been successful to add water-insoluble telogens in powdered form, as an emulsion or suspension, to aqueous monomer solutions.

The telomerization of water-soluble monomers with water-insoluble telogens in an organic solvent is suitable in principle. However, working in organic solvents necessitates special technical precautions during the procedure. In addition, the solvent interfers with important applications of the telomers produced, such as, for example, when the telomers are used as surfactants. Consequently, the products must be isolated by precipitation or distillation of the solvent and again dissolved in water before their application. This means additional work with some products.

OBJECTS OF THE INVENTION

It is an object of this invention to provide a novel process for producing telomers.

It is also an object of this invention to provide for the telomerization of water-soluble monomers and water-insoluble telogens whereby the use of solvents can be avoided.

It is a further object of the invention to provide for the telomerization of water-soluble monomers and water-insoluble telogens whereby ready-to-use aqueous solutions of telomers are produced directly.

It is a yet further object of this invention to provide for the telomerization of water-soluble monomers and substantially water-insoluble telogens wherein surfactants are added in amounts sufficient to cause a hydrotropic effect with regard to the telogens.

These and other objects of the invention will become more apparent in the discussion below.

DETAILED DESCRIPTION OF THE INVENTION

Applicants have surprisingly found a procedure by which the above-mentioned objects can be achieved. According to the procedure, telomerization is carried out in such a manner that practically water-insoluble telogens are solubilized by the addition of surfactants in amounts sufficient to impart a hydrotropic effect. In connection with the instant invention "practically water-insoluble" means that the telogens are to the extent of at least 95% water-insoluble even at the reaction temperature. More specifically, telomers are produced by the reaction, i.e., telomerization, in aqueous solution of water-soluble monomers, practically water-insoluble telogens, and a solubilizing amount of a surfactant.

Preferably from about 10 to 150 percent by weight, more preferably from about 40 to 100 percent by weight, of surfactant is used, based upon the weight of the telogen.

In a preferred embodiment of the invention, the telogens comprise alkyl or alkylaryl compounds containing from 1 to 4 mercapto groups and, optionally, 1 or 2 hydroxyl groups and having from about 3 to 20 carbon atoms in the alkyl or alkylaryl moiety per mercapto or hydroxyl group. The telogens may also contain other functional groups such as carboxyl groups, aldehyde groups, aryl radicals, nitro groups, or halogen atoms. Suitable telogens, or regulators, include, for example, 1-mercapto-2-hydroxyalkanes, such as 1-mercapto-2-hydroxyoctane, 1-mercapto-2-hydroxynonane, 1-mercapto-2-hydroxydecane, 1-mercapto-2-hydroxyundecane, or the like, and regular alkylmercaptans with 7 or more carbon atoms.

Practically all known ionic and nonionic surface-active compounds or tensides are suitable as surfactants, or solubilizing agents. These tensides contain in the molecule at least one hydrophobic organic radical and an anionic, zwitterionic, or nonionic group which makes them soluble in water. The hydrophobic radical usually is an aliphatic hydrocarbon radical with from about 8 to 26, preferably from about 10 to 22 and especially from about 12 to 18, carbon atoms or an alkylaryl radical with from about 6 to 18, preferably from about 8 to 16, aliphatic carbon atoms.

Suitable as anionic tensides are, for example, soaps of natural or synthetic, preferably saturated fatty acids, or, if desired, of resinic or naphthenic acids. Suitable synthetic anionic tensides are those of the sulfonate, sulfate, and synthetic carboxylate type.

Suitable tensides of the sulfonate type include alkylbenzene sulfonates ($C_9$–$C_{15}$-alkyl), mixtures of alkene and and hydroxyalkane sulfonates, as well as alkane disulfonates such as those that are obtained, for example, from monoolefins with terminal and non-terminal double bonds, by sulfonation with gaseous sulfur trioxide and subsequent alkaline or acid hydrolysis of the products of the sulfonation. Also suitable are alkane sulfonates that can be obtained from alkanes by sulfochlorination or sulfoxidation and subsequent hydrolysis or neutralization, or by bisulfite addition to olefins. Other suitable tensides of the sulfonate type are the esters of $\alpha$-sulfo fatty acids, for example, the $\alpha$-sulfonic acids from hydrogenated methyl or ethyl esters of coconut oil, palm kernel, or tallow acid.

Suitable tensides of the sulfate type are the sulfuric acid monoesters of primary alcohols (for example, from alcohols of coconut oil or tallow or from oleyl alcohol)

and those of secondary alcohols. Also suitable are fatty acid alkanolamides, fatty acid monoglycerides, or, particularly, sulfates adducts of from 2 to 40 mols of ethylene oxide onto primary or secondary fatty alcohols or $C_6$–$C_9$-alkyl phenols.

The anionic tensides can be present in the form of their water-soluble salts, such as sodium, potassium, and ammonium salts, as well as their salts with organic bases such as ethanolamine, diethanolamine, or triethanolamine.

Suitable as nonionic tensides are adducts of from 4 to 40, preferably from 4 to 20, mols of ethylene oxide onto 1 mol of fatty alcohol, alkylphenol, fatty acid, fatty amine, fatty acid amide, or alkane sulfonamide. Of practical interest are the adducts of from 5 to 16 mols of ethylene oxide onto fatty alcohols of coconut oil or tallow, onto oleyl alcohol, or onto secondary alcohols having from 8 to 18, preferably from 12 to 18, carbon atoms, as well as onto alkylphenols or dialkylphenols having from 6 to 14 carbon atoms in each alkyl radical. In addition to these water-soluble nonionic substances, polyglycol ethers with from 1 to 4 ethylene glycol ether radicals in the molecule that are insoluble or substantially insoluble in water also may be of interest, especially when they are used together with water-soluble nonionic or anionic tensides.

Further suitable as nonionic tensides are the water-soluble adducts of ethylene oxide onto polypropylene glycol, alkylenediamine-polypropylene glycol, and alkylpolypropylene glycols with from 1 to 10 carbon atoms in the alkyl chain, which contain from 20 to 250 ethylene glycol ether groups and from 10 to 100 propylene glycol ether groups in which the polypropylene glycol chain acts as a hydrophobic radical.

Suitable as ionic tensides are quaternary ammonium compounds that contain two saturated alkyl radicals with from 14 to 26, preferably from 16 to 20, carbon atoms in each alkyl moiety and at least one quaternary nitrogen atom in the molecule. Preferably the ionic tensides correspond to one or more compounds of the following formulas:

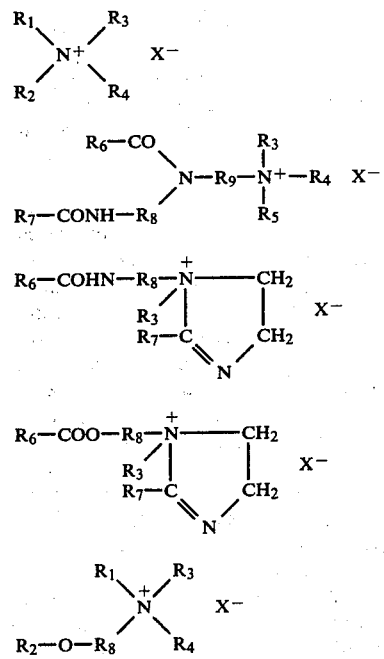

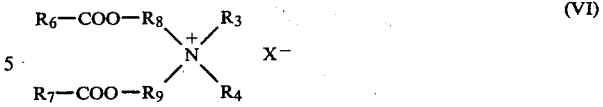

wherein $R_1$ and $R_2$, which can be the same or different, each represent an alkyl of from 14 to 26, preferably from 16 to 20, carbon atoms; $R_3$, $R_4$, and $R_5$, which can be the same or different, each represent a lower alkyl or alkylol of from 1 to 4 carbon atoms; $R_6$ and $R_7$, which can be the same or different, each represent an alkyl of from 13 to 21, preferably from 15 to 19, carbon atoms; and $R_8$ and $R_9$, which can be the same or different, each represent an alkylene of from 2 to 4 carbon atoms or a hydroxyalkylene of 3 to 4 carbon atoms. In Formulas I to VI, $X^-$ represents an anion of an inorganic or organic acid having from 1 to 8 carbon atoms. For example, $X^-$ may be the acid radical of an acid such as hydrochloric acid, sulfuric acid, acetic acid, glycolic acid, lactic acid, methylsulfuric acid, methanesulfonic acid, ethanesulfonic acid, toluenesulfonic acid, or the like. An especially preferred anion $X^-$ is the chloride anion.

The process according to the invention can be carried out with water-soluble monomers such as water-soluble acrylic compounds. Most suitable for this purpose are acrylic acid and methacrylic acid themselves if desired together with water-soluble esters of acrylic acid or methacrylic acid. Suitable alcohol components for the esters include ethylene glycol, propanediol, and glycerol, trimethylolpropane, which shall, however, be only partially esterified. Acrylamide is a preferred water-soluble acrylic compound. It is also possible to include other water-soluble monomers, such as N-vinyl-2-pyrrolidone, or also monomers less water-soluble, such as N-methyl-acrylamide, N-ethyl-acrylamide, 2-acrylamido-2-methylpropane-sulfonic acid, vinyl acetate, or acrylonitrile, for the telomerization.

Depending on the ratio of telogen to monomer selected, the solids content of the reaction mixture shall be from about 10 to 55, especially from about 25 to 50, percent by weight, based on the total weight of the reaction mixture. It has been observed that the telogen was more readily soluble in monomer solutions of higher concentration than in those of lower concentration. A favorable concentration was from about 30 to 50 percent by weight of monomer. An increase in the reaction temperature has a favorable influence on the course of the reaction. Suitable reaction temperatures are from about 50° C. to the boiling point of the reaction mixture. The preferred temperature range is from about 100° C. to the boiling point of the reaction mixture or, when the work is performed in closed systems, to also slightly above the boiling point, for example, from about 100° to 130° C.

Suitable as initiators for the process according to the invention are particularly pre-compounds such as ammonium peroxydisulfate, potassium peroxydisulfate, potassium or sodium peroxydiphosphate, or hydrogen peroxide, or in certain cases also potassium dichromate, cerium (IV)-compounds, tert.butylhydroxyperoxide, azoisobutyric acid dinitrile, or succinic acid dodecylchloramide. When peroxide catalysts are used, the additional use of metallic activators such as iron sulfate or ammonium iron sulfate may be advantageous. An initiation of the telomerization through other radical-forming substances such as short-wave light or neutrons or electron radiation is theoretically possible.

The process according to the invention can be carried out batch-wise or continuously. For continuous preparation, approximately two or three solutions of the components needed for the reaction can be prepared and fed continuously, in predetermined amounts, into a reaction tube. It is possible to feed the dissolved or solubilized reaction partners in their entirety, in the predetermined amounts, into the opening of the tube, or to add one component, for example, the initiator, only partly to the mixture to be polymerized and to add the remaining amounts to the reaction mixture after it has traversed a certain length of the tube. The tube shall consist of a metal that is inert to the reaction medium. Suitable for this purpose are metal tubes of, for example, refined steel ($V_2A$ or $V_4A$), nickel, or silver, or also tubes of silicone rubber. The dimensions shall be chosen so that a good heat exchange takes place. The inside diameter of the tube is from about 3 to 150 mm and the length is from about 5 to 150 m. The reaction tube is placed in a container filled with liquid, for example, water, and equipped with a thermostat. This container is set to maintain a temperature from about 50° to 120° C.

The telomerized substances that can be prepared according to the invention can be used for the processing of water, for the conditioning of water for steam kettles, particularly as a deposit inhibitor, or also for the after-treatment of metal surfaces, such as anodically oxidized aluminum.

The telomers prepared according to the described process possess surfactant properties and have an emulsifying and dispersing, as well as stabilizing, effect. They can advantageously be used as to emulsify telogens, as well as to disperse calcium soap or pigments.

The product prepared by the process according to the invention are especially advantageous for application as polymerization emulsifying agents, for example, in the preparation of plastic and rubber, or elastomer, dispersions, since they are obtained directly as aqueous solutions and can be used in this form.

Thus, an emulsion polymerization leading from monomers to a plastic or rubber dispersion can be carried out directly following a preceding telomerization, without intermediate isolation of the telomer.

The following examples are intended to illustrate the invention and should not be construed as limiting the invention thereto.

EXAMPLES

Examples 1 to 6

Batch Preparation Procedure

An amount of mercaptan (see Table 1, below, for the amount), 10 gm of surfactant, and 30 gm of water were placed in a three-neck flask with agitator, reflux condenser, $N_2$-feeding line, and 2 dripping funnels, and the mixture was heated in a water bath at 100° C. Monomers (in the amount set forth in Table 1) in aqueous solution and a solution of 200 mg of $(NH_4)_2S_2O_8$ in 5 gm of water as radical initiator were added to the refluxing mixture over a period of approximately 20 minutes with vigorous agitation and $N_2$-purging. After addition of another 100 mg of $(NH_4)_2S_2O_8$ in 2 gm of water, the mixture was allowed to react for 30 minutes at 100° C. bath temperature, to complete the conversion. The telomers were isolated by precipitation with acetone and dried in a vacuum drying oven.

In Examples 1 to 5 1-mercapto-2-hydroxydecane was used as the telogen, and in Example 6 the telogen was 1-mercaptododecane. Acrylic acid and acrylamide were used as monomers in each example. Solubilization was achieved with 10 gm of the adduct of 5 mols of ethylene oxide onto 1 mol of tallow fatty amine (Examples 1 to 3) and with the sulfation production of the adduct of 2 mols ethylene oxide onto lauryl alcohol (Examples 5 and 6). In Example 4, the telomer product from Example 1 was used as the surfactant to solubilize the telogen.

Various reaction parameters, including molar ratios of mercaptan to acrylic acid and acrylamide and the amounts of each, and the results of the procedures of Examples 1 to 6, are set forth in the following table:

TABLE 1

| Example | Molar Ratio (Telogen: acrylic acid: acrylamide) | Mercaptan (gm) | Acrylic Acid (gm) | Acryl- amide (gm) | Total Water (gm) | Telomer Content (%) | Specific Viscosity (1% in 1 N $NaNo_3$ at 20° C.) |
|---|---|---|---|---|---|---|---|
| 1 | 1:8:8 | 16.0 | 42.0 | 42.0 | 90.0 | 50.0 | 0.25 |
| 2 | 1:10:10 | 13.3 | 43.3 | 43.3 | 90.1 | 50.0 | 0.32 |
| 3 | 1:12:12 | 11.3 | 44.4 | 44.4 | 89.9 | 50.0 | 0.29 |
| 4 | 1:8:8 | 16.0 | 42.0 | 42.0 | 90.0 | 50.0 | 0.36 |
| 5 | 1:8:8 | 9.6 | 25.2 | 25.2 | 130.0 | 30.0 | 0.25 |
| 6 | 1:12:12 | 10.5 | 44.8 | 44.8 | 89.9 | 50.0 | 0.88 |

Examples 7 to 13

Continuous Preparation Procedure

A tube reactor of refined steel ($V_4A$), equipped with a jacket and thermostat, was used. Length: 4.2 m; diameter: 0.46 cm.

The complete reaction mixture—including 200 mg of $(NH_4)_2S_2O_8$—was transferred into a flask with a bottom stirrer and agitated so vigorously that mixing with air took place. With the aid of a metering pump, the batch was pumped through the bottom tube into the tube reactor, which was heated to 80° C. The material remained in the tube reactor for 15 minutes during passage. The reaction mixture was transferred from the tube reactor into a flask that contained nitrogen, for the completion of the reaction (30' at 100° C.).

Working up consisted of precipitation with acetone and drying under vacuum.

1-Mercapto-2-hydroxydodecane was used as the mercaptan telogen in all examples. In the Examples 7 to 10, 10 mols of acrylic acid and 10 mols of acrylamide were used for each mol of the mercaptan, respectively, and in Examples 11 to 13, 20 mols of acrylamide, acrylic acid, methacrylic acid, were used, respectively. The following were used for solubilization:

Examples 7 and 8: 10 gm of sulfation product of the adduct of 2 mols of ethylene oxide onto 1 mol of lauryl alcohol;

Example 9: 4 gm of sulfation product of the adduct of 30 mols of ethylene oxide onto 1 mol of lauryl alcohol;

Example 10: 4 gm of reaction product of 10 mols of ethylene oxide with 1 mol of lauryl alcohol and 6 gm of cetyltrimethylammonium chloride; and Examples 11 to 13: 10 gm of the sulfation product of the adduct of 2 mols of ethylene oxide onto 1 mol of lauryl alcohol.

Various reaction parameters, including the ratio of the mercaptan to the acrylic acid and acrylamide, and the results of the procedures of Examples 7 to 13, are shown in the following table:

TABLE 2

| Example | Molar Ratio (Telogen: acrylic acid: acrylamide) | Surfactant (gm) | Mercaptan (gm) | Monomer 1 (gm) | Monomer 2 (gm) | Water (gm) | Telomer Content (%) | Specific Viscosity (1% in 1 N NaNO$_3$ at 20° C.) |
|---|---|---|---|---|---|---|---|---|
| 7 | 1:10:10 | 10.0 | 5.3 | 17.5 | 17.5 | 149.7 | 20.0 | 0.33 |
| 8 | 1:10:10 | 4.0 | 5.3 | 17.5 | 17.5 | 155.7 | 20.0 | 1.06 |
| 9 | 1:10:10 | 10.0 | 5.3 | 17.5 | 17.5 | 149.7 | 20.0 | 1.98 |
| 10 | 1:10:10 | 4.0 + 6.0 | 8.0 | 26.0 | 26.0 | 130.0 | 30.0 | 0.36 |
| 11 | 1:20 | 10.0 | 8.0 | 52.0 | — | 130.0 | 30.0 | 0.33 |
| 12 | 1:20 | 10.0 | 8.0 | 52.0 | — | 130.0 | 30.0 | 0.37 |
| 13 | 1:20 | 10.0 | 6.8 | 53.2 | — | 130.0 | 30.0 | 0.28 |

Comparison Examples 1 to 6

Examples 1 to 6 were repeated, but without solubilizers. Highly viscous, turbid polymer solutions that could not be poured were obtained in each case. With regard to Comparison Examples 1 to 5, 1-mercapto-2-hydroxydodecane crystallized out after a few days. Comparison Example 6 resulted in a permanently turbid liquid. The products of the comparative examples had specific viscosities that were all above 3.0.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the telomerization in an aqueous phase of water-soluble monomers and water-insoluble telogens containing from 1 to 4 mercapto groups and, optionally, 1 to 2 hydroxy groups in the molecule and which have an alkyl or alkaryl chain of from 3 to 20 carbon atoms per mercapto or hydroxy group, which consists essentially of the steps of:

(a) heating an aqueous mixture of the water-insoluble monomers, the water-insoluble telogens, and an effectively solubilizing amount of at least one surface-active compound selected from the group consisting of ethoxylated nonionic tensides, quaternary alkylammonium compounds, and sulfated adducts of from 2 to 40 mols of ethylene oxide onto primary or secondary fatty alcohols or $C_6$–$C_9$-alkyl-phenols or water-soluble salts thereof, to effect telomerization; and (b) recovering telomers produced.

2. The process of claim 1, wherein the water-insoluble telogens are admixed with the one or more surface-active compounds in an aqueous mixture prior to introduction of the water-soluble monomers.

3. The process of claim 1, wherein from about 10 to 150 percent by weight of surface-active compound, based on the weight of the telogens, is used.

4. The process of claim 3, wherein from about 40 to 100 percent by weight of surface-active compound, based on the weight of telogens, is used.

5. The process of claim 1, wherein the telogens are 1-mercapto-2-hydroxyalkanes.

6. In a method of preparing telomers by heating a reaction mixture containing water-soluble monomers, water-insoluble telogens, and at least one surface-active compound, the improvement which comprises using an effectively solubilizing amount of a product of claim 1 as a surface-active compound.

7. A dispersing agent composition for polymer or elastomer production, which comprises an effective amount of a product prepared according to claim 1 in an aqueous media.

* * * * *